Aug. 7, 1956  E. BECK ET AL  2,757,506
PREFORMING HEAD
Filed March 29, 1955  2 Sheets-Sheet 1

INVENTORS:
EUGENE BECK and
CARL T. LANSTROM,
BY: Donald G. Dalton
their Attorney.

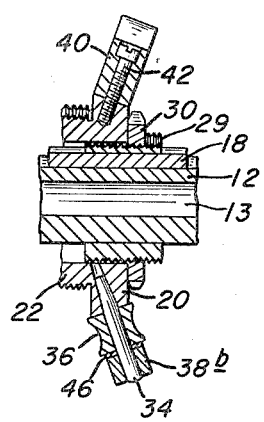
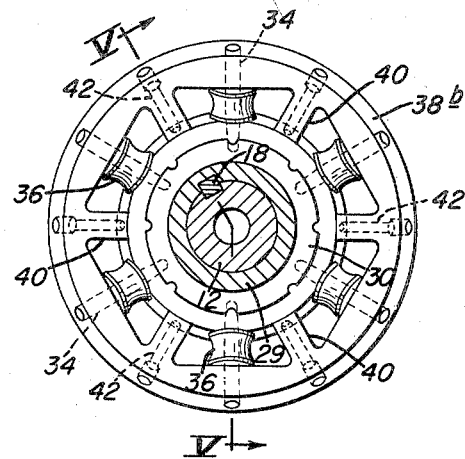
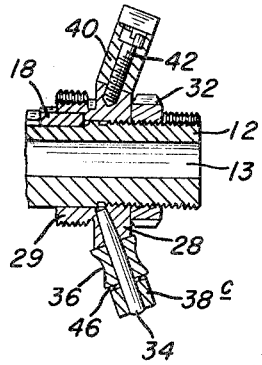
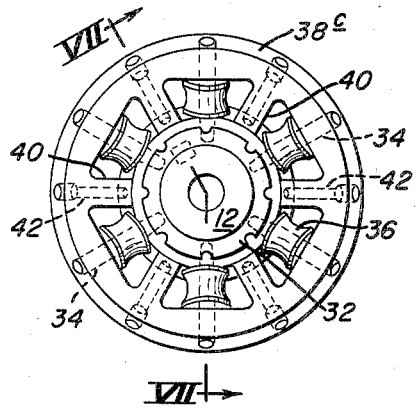
INVENTORS:
EUGENE BECK and
CARL T. LANSTROM,
BY: Donald G. Dalton
their Attorney.

United States Patent Office 2,757,506
Patented Aug. 7, 1956

2,757,506

PREFORMING HEAD

Eugene Beck, Antioch, and Carl T. Lanstrom, Concord, Calif., assignors to United States Steel Corporation, a corporation of New Jersey Application March 29, 1955, Serial No. 497,726

5 Claims. (Cl. 57—9)

The present invention relates to an improved preforming head for wire stranding machines.

As used herein, the term "stranding machine" refers to a machine for twisting either a plurality of individual wires as components into a strand or a plurality of strands as components into a rope or cable. Such a machine includes fundamentally a number of supply reels, a guide plate, a preforming head, a closing die and a drum on which the finished stranded wire structure is wound. The preforming head comprises a hollow shaft, around the otuside of which are supported several groups of preforming rolls. The core component of the stranded wire structure passes through the shaft bore, while each of the outside components passes from its supply reel, through the guide plate and around the preforming rolls of one of said groups. Usually the supply reels are mounted in a rotatable frame, and the guide plate and preforming head rotate in unison therewith about the core component as an axis and thus twist the outside components together at the closing die, although it is possible to make these parts stationary and instead rotate the haul-off mechanism about this same axis. The purpose of the preforming head is to induce a helical set in the components and thus minimize the tendency of the stranded wire structure to unravel. For a more complete disclosure of exemplary machines of this sort reference can be made to Conner Patent No. 1,781,894, Clark Patents No. 1,823,886 and No. 1,894,756, or Briggs Patent No. 2,036,393, although obviously the preforming head of the present invention is not limited to use with those specific machines.

An object of the present invention is to provide a preforming head which will maintain its coaxial alignment with the stranding machine at all times during the stranding operation and which furnishes improved support for the preforming rolls.

This and other objects will become more apparent after referring to the following specification and attached drawings, in which:

Figure 4 is a cross sectional view taken on the line IV—IV of Figure 1;

Figure 5 is a sectional view taken on the irregular line V—V of Figure 4;

Figure 6 is an end view taken on the line VI—VI of Figure 1; and

Figure 7 is a sectional view taken on the line VII—VII of Figure 6.

Figure 1:
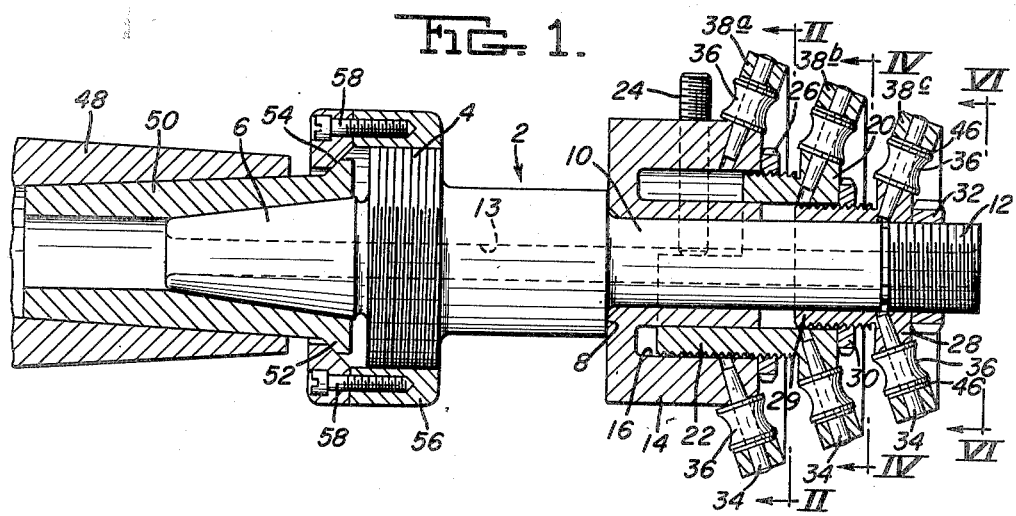
Figure 1 is a longitudinal sectional view.
Figure 3:
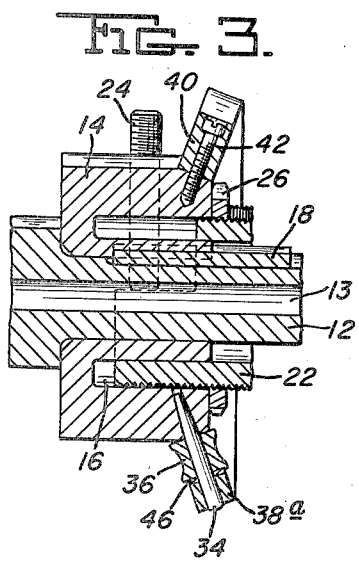
Figure 3 is a sectional view taken on the irregular line III—III of Figure 2.

Referring more particularly to the drawings the reference numeral 2 designates the preforming head arbor of the preforming head, which is provided with an externally threaded hub 4 and a tapered shank 6 at one end and a shoulder 8 and an elongated reduced diameter portion 10 at its other end. The reduced diameter portion 10 is externally threaded at its outer end as at 12. A center bore 13 extends through the shank and arbor.

A rear inner ring 14 having an annular socket 16 around its center hub is mounted on the reduced diameter portion of the arbor by means of a key and keyway combination 18 with one side abutting the shoulder 8. A middle inner ring 20 having a cut-out threaded annular flange 22 is mounted on the reduced diameter portion 10 with its flange 22 fitting into the annular socket 16 of the inner ring 14. Two set screws 24 are threaded tangentially through the inner ring 14 to bear against the annular flange 22 of the center ring 20 and thereby prevent relative rotational movement of the two rings. A circular nut 26 is threaded on the flange 22 of the ring 20 and abuts the ring 14 to hold it against longitudinal movement. A front inner ring 28 having a reduced diameter flange 29 is keyed on the arbor portion 10 with the flange 29 fitting between the center ring 20 and the arbor. The flange 29 is externally threaded and accommodates a circular nut 30 which abuts the center ring 20 and prevents longitudinal displacement thereof. A nut 32 is threaded on the end 12 of the arbor and abuts the front ring 28 to thereby prevent longitudinal displacement of the entire set of three rings.

A series of tapered pins 34 are fitted around the outer circumference of each of the rings 14, 20 and 28 in spaced relation for journaling preforming head rollers 36.

Figure 2:
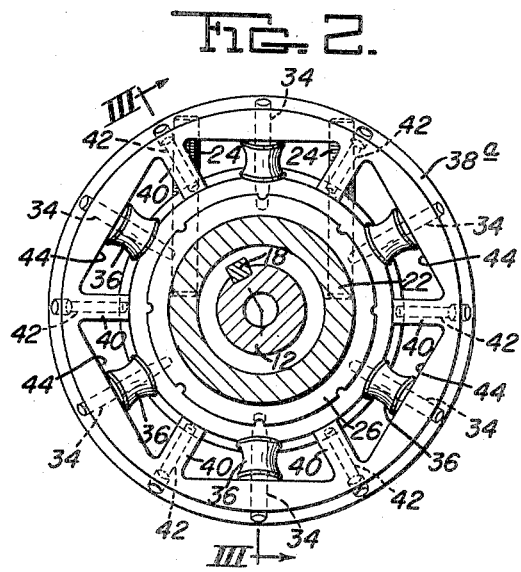
Figure 2 is a cross sectional view taken on the line II—II of Figure 1.

Outer support for the rollers 36 is provided by means of outer rings 38a, 38b and 38c which fit around the outer ends of the set of pins on inner rings 14, 20 and 28, respectively. Each of the rings 38a, 38b and 38c is provided with spaced bearing posts 40 which bear on the respective inner ring between the pins 34, as best shown in Figures 2, 4 and 6. Each of the posts 40 is tapped to accommodate a screw 42 which is threaded by its inner end into the inner ring so as to hold the outer bearing ring in position. Each of the outer bearing rings is provided with inner bearing faces 44 which extend between the posts 40 and bear on the rollers 36. The posts 40 are dished so as to fit properly on the outer ends of the pins 34 which are offset from the vertical for the purpose of disposing the rollers 36 in a conical surface coaxial with the arbor. A thrust washer 46 is fitted on each pin 34 between the bearing surface 44 and each of the rollers 36. Thus, each of the pins is supported at its inner end by being fitted into the inner ring and at its outer end by the rings 38a, 38b and 38c as described.

This arrangement of inner and outer support for the pins 34 reduces considerably the breakage of pins particularly where smaller diameter wire or strands are being processed which requires the use of thin pins. The support provided by the outer rings 38a, 38b and 38c and the thrust washers 46 also reduces the possibility of jammed rollers.

The preforming head is fitted into the mast 48 of a stranding machine by inserting the shank 6 into the bore of the mast which is fitted with an adapter 50. The adapter 50 is a continuous annular piece with a machined self-holding taper on the outer surface and a standard taper on the inner surface. The adapter is provided with an end flange 52 which is engaged by an inner flange 54 of a collar 56 which is threaded on the hub 4. The flange 54 is separate from the collar 56 and is held thereon by means of screws 58. The adapter is pressed into the tapered seat of the mast 48 and held in place by set screws (not shown) which thread through the mast and bear on the outer tapered surface of the adapter. After the shank 6 has been inserted in the adapter 50, the screws 58 are tightened so as to force the shank 6 into a secure fit in the tapered inner bore of the adapter. This arrangement provides a positive secure fit each time the preforming head is mounted on the mast of the stranding machine so that the head maintains its alignment in the machine. After installation in the stranding machine, the improved preforming head of our invention preforms the wire or strand being processed in the same manner as a conventional preforming head. The art of stranding wire rope which remains unchanged through use of our improved preforming head is well known and will not be described here.

While one embodiment of our invention has been shown and described, it will be apparent that other adaptations and modifications may be made without departing from the scope of the following claims.

We claim:

1. A preforming head comprising an arbor, a plurality of inner rings spaced axially along the arbor, an outer ring for each inner ring, each outer ring having circumferentially spaced bearing posts extending radially inward thereof adapted to fit on the exterior of the inner ring, a plurality of pins extending radially through each of said outer rings into the inner ring on which the outer ring is mounted substantially midway between said posts, and a preforming roller journaled on each pin.

2. A preforming head as defined by claim 1 characterized by screws extending through said posts into said inner rings for securing the outer rings thereto.

3. A preforming head as defined by claim 1 characterized by the outer rings having inner bearing faces normal to said pins extending between said posts.

4. A preforming head as defined by claim 1 characterized by said posts being dished relative to said outer rings, and the axes of the pins of each ring lying in a conical surface coaxial with said arbor.

5. In a preforming head including an arbor having rings spaced therealong with rollers journaled radially thereon, the combination therewith of a tapered shank extending axially from one end of the arbor, an adapter fitting in the bore of a laying-machine mast adapted to receive said shank, and means for drawing said shank into the adapter, said means including a threaded hub on said arbor inwardly of said shank and a sleeve screwed thereon, said sleeve having an internal flange engaging the adjacent end of said adapter.

References Cited in the file of this patent

UNITED STATES PATENTS

| | | |
|---|---|---|
| 2,105,338 | Sunderland | Jan. 11, 1938 |
| 2,124,864 | Weller | July 26, 1938 |
| 2,476,180 | Charles | July 12, 1949 |